(12) United States Patent
Wang et al.

(10) Patent No.: US 7,479,616 B2
(45) Date of Patent: Jan. 20, 2009

(54) COMPOUND LASER BEAM WELDING

(75) Inventors: Pei-Chung Wang, Troy, MI (US);
Shigeki Saitoh, Yokohama (JP); Fujiko Matsuda, Kanagawa (JP); Masami Takeshi, Kanagama (JP); Masatake Saito, Kanagama (JP)

(73) Assignees: General Motors Corporation, Detroit, MI (US); Suzuki Motor Corporation, Shizuoka (JP)

( * ) Notice: Subject to any disclaimer, the term of this patent is extended or adjusted under 35 U.S.C. 154(b) by 755 days.

(21) Appl. No.: 10/830,493

(22) Filed: Apr. 20, 2004

(65) Prior Publication Data
US 2005/0230364 A1    Oct. 20, 2005

(51) Int. Cl.
*B23K 26/00* (2006.01)
*B23K 26/02* (2006.01)

(52) U.S. Cl. .......................... 219/121.64; 219/121.63; 219/121.76; 219/121.81

(58) Field of Classification Search ............ 219/121.64, 219/121.63, 121.76, 121.81, 121.85, 121.78
See application file for complete search history.

(56) References Cited

U.S. PATENT DOCUMENTS

| | | | | |
|---|---|---|---|---|
| 3,567,899 A * | 3/1971 | Iceland et al. | .......... | 219/124.34 |
| 3,588,440 A * | 6/1971 | Morse | .................. | 219/121.65 |
| 4,857,697 A * | 8/1989 | Melville | ................ | 219/121.63 |
| 5,665,255 A | 9/1997 | Busuttil | | |
| 5,811,756 A | 9/1998 | Horita et al. | | |
| 5,874,708 A * | 2/1999 | Kinsman et al. | ....... | 219/121.64 |
| 6,642,473 B2 * | 11/2003 | Stiers et al. | ............ | 219/121.63 |
| 6,646,225 B1 * | 11/2003 | Wang et al. | ............ | 219/121.64 |

\* cited by examiner

*Primary Examiner*—M. Alexandra Elve

(57) ABSTRACT

Hot cracking in laser welds produced in metal workpieces, especially aluminum or magnesium sheet alloys, is avoided by suitably combining the beams of two different lasers, for example a $CO_2$ laser and a YAG laser, into a compound beam that is moved along a weld path in the surface of the workpiece. The power level of at least one of the lasers is cyclically varied so that weld nugget segments of different alternating, hot crack free, configurations are produced in a linear weld.

4 Claims, 2 Drawing Sheets

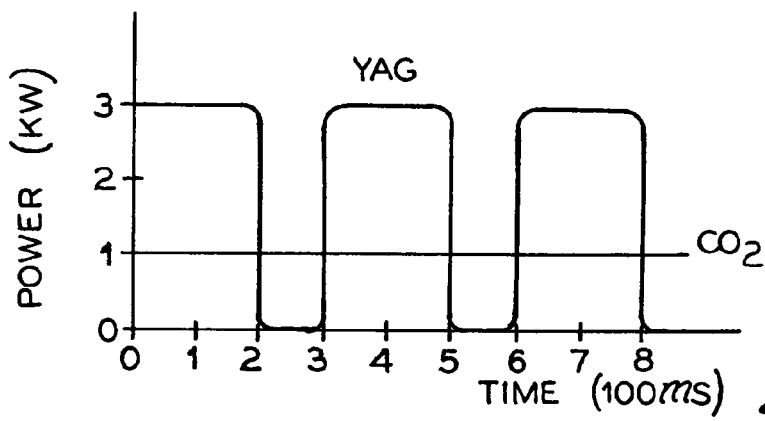
Fig. 4
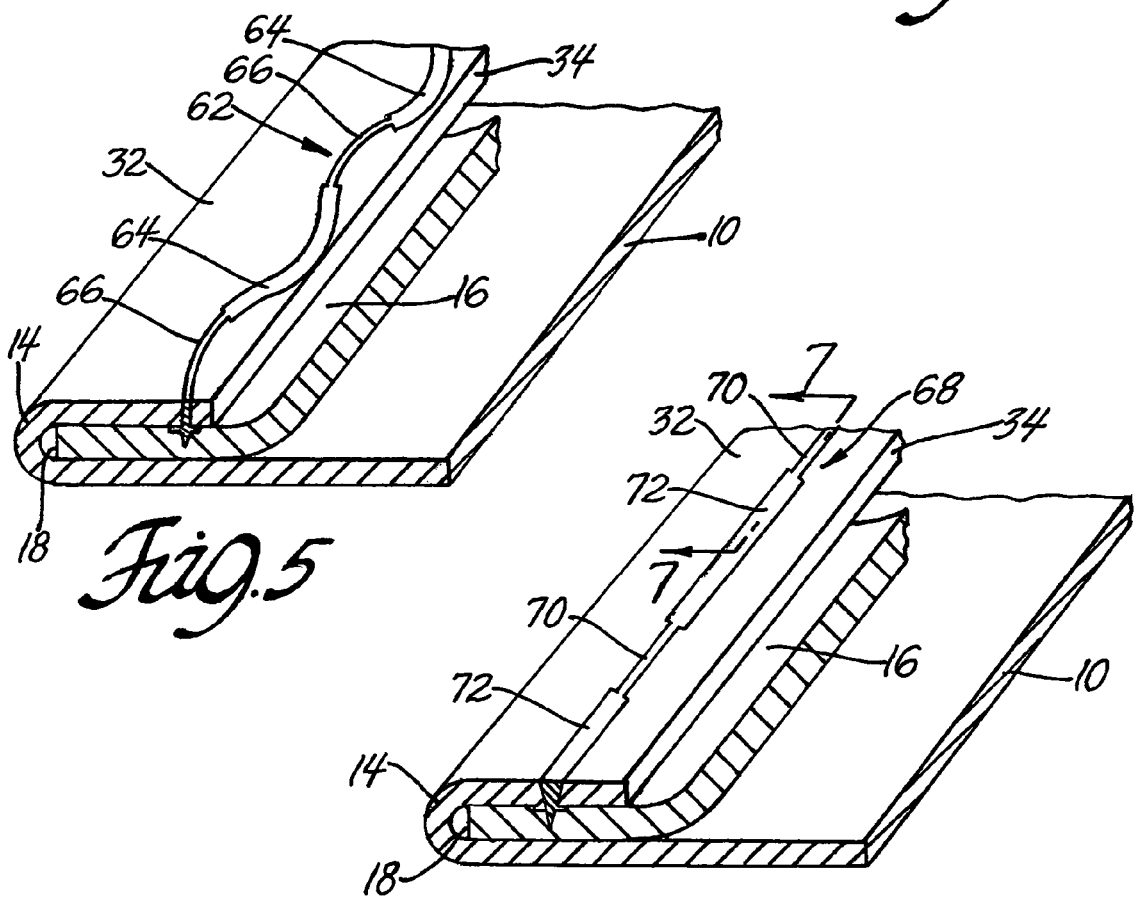
Fig. 5
Fig. 6
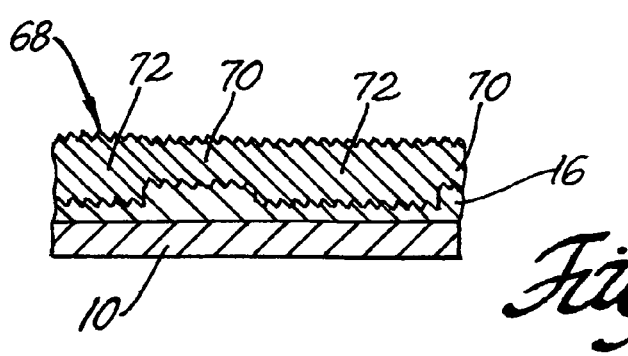
Fig. 7

COMPOUND LASER BEAM WELDING

TECHNICAL FIELD

This invention pertains to laser welding of metal alloys to avoid hot cracking at the weld site. More particularly, this invention pertains to laser welding of non-ferrous light metal alloys, such as aluminum or magnesium metal alloys, with laser radiation that is a compound beam combining two different laser sources.

BACKGROUND OF THE INVENTION

Metal workpieces are welded by directing a laser beam of suitable energy at a selected weld location on the surface of the metal. Some of the energy of the laser radiation is absorbed by the metal, melting the material at the region of incidence to a depth suitable to join the metal layers. After the laser beam is shut off or moved away along a weld path in the workpiece, the molten metal quickly dissipates heat to the surrounding unheated metal and re-solidifies to form a weld nugget between the layers to be joined. High power carbon dioxide ($CO_2$) gas lasers and neodymium: YAG solid-state lasers, for example, are used in material processing applications including machining, heat treating and welding.

An advantage of laser welding is that a beam of coherent radiation can be focused to quickly, but momentarily, form a deep narrow keyhole of molten metal for the weld. But a disadvantage is that the weld nugget formed in this rapid manner often exhibits embrittlement or hot cracking along the weld joint, especially in light metal alloys with relatively high thermal conductivity. Efforts are made to control the energy level and/or the path of the laser to produce a puddle of weld metal of suitable shape to reduce embrittlement of the weld nugget, but in many laser welding applications porosity and/or hot cracking of the weld nugget remains as a problem.

It is an object of this invention to provide a method of welding metal workpieces by combining the energies of two laser beams of different wavelengths so as to reduce shrinkage stresses and, consequently, hot cracking in the weld nugget and other weld defects. It is a more specific object of this invention to provide an improved method of welding aluminum or magnesium workpieces by combining two laser beams and controlling their respective power levels to produce welds without crack formation in the weld nugget.

SUMMARY OF THE INVENTION

This invention exploits the differing characteristics of two different lasers to modulate the combined energies of the lasers in a metal welding operation. In accordance with a preferred embodiment of the invention, radiation from a $CO_2$ laser is combined with radiation from an Nd: YAG laser (sometimes referred to simply as a YAG laser in this specification) to form a crack-free weld between two aluminum alloy sheet metal workpieces. Different laser beams have different properties and the differences can be utilized in welding applications. By way of illustrative example, the practice of the invention will be described in forming a generally continuous (linear) weld between flanges of an aluminum alloy outer automotive tailgate panel and an aluminum alloy inner panel.

In this example, the tailgate panels are assembled with the flange of the outer panel bent around the edge of the flange of the inner panel in a hemming operation. The assembled panels are supported so that combined beams of a $CO_2$ laser and a YAG laser can be moved along the hemmed periphery of the panels to form a continuous weld line around that perimeter. The thickness of each of the panels is about 1.1 to 1.2 millimeters and the total power of the compound laser beam must penetrate through the outer layer of the hemmed flange assembly into the inner layer. The heat transfer characteristics of the two layers are different because the outer layer is wrapped around the end of the inner layer, and this difference in heat dissipation paths affects the solidification of the weld pool into a crack-free nugget.

$CO_2$ lasers have a narrow, focused beam that makes a narrow keyhole and weld pool while the YAG beam is broader and produces a wider weld pool. In this hem weld embodiment, the power of the $CO_2$ laser is maintained at about 1.0 kilowatt while the power of the YAG laser is cycled from about 3 KW for 200 milliseconds (ms) to 0 KW (shut off) for 100 ms. This uneven on-off YAG laser cycling is repeated at a frequency of 3.3 Hz during the formation of the linear weld seam. Thus, the total power of the compound beam varies from 4 KW to 1 KW with each 200 ms and 100 ms interval, respectively, at a frequency of 3.3 Hz. The compound laser beam is moved at a predetermined speed, for example 5.5 meters per minute, around the periphery of the hemmed flanged assembly. The path of the compound beam may follow directly the edges of the assembly (a generally straight path along each side of the assembly) or the beam may be advanced in a sinusoidal or other non-straight path along the edges.

The effect of variation in compound laser beam power with welding period interval is to produce a resulting variation in the size or configuration of the weld nugget along the continuous weld path, and consequently reduce the shrinkage stresses in the welded hem assembly. During the 200 ms intervals of high compound beam power, the linear weld nugget segments are relatively wide and deep. During the shorter intervening low beam power intervals, with only $CO_2$ beam power, the linear weld nugget segments are narrower and shallower. It is found that this pattern of varying weld nugget configurations varies the cooling pattern of the weld pools and produces weld segments that are free of hot cracking and significantly reduces the shrinkage stresses.

The above example is illustrative of one embodiment of the practice of the invention. In this embodiment, two different laser beams at different power settings were combined for repeated 200 ms intervals and one beam was shut off for the immediately following 100 ms intervals. But other combinations of laser beam power levels and interval durations may be used. The power levels, the variation in power levels and the duration of the selected power levels for the two lasers used in welding a particular workpiece assembly may be determined experimentally. The setup experiments may be directed by use of thermal modeling. The goal of the use of the compound laser beam is to periodically vary the power input to achieve suitable weld nugget configurations along the entire length of the weld while periodically varying the profile, depth and width, of the weld nugget to avoid thermal residual stresses in the weld.

Other objects and advantages of the invention will become more apparent from a detailed description of preferred embodiments which follows.

BRIEF DESCRIPTION OF THE DRAWINGS

FIG. 4 is a graph of one example of laser power variations for individual $CO_2$ and YAG laser beams at successive 200 ms and 100 ms intervals during a welding period for an embodiment of this invention in which the beams are combined to produce a linear hem weld between an AA6111-T4 outer tailgate panel and an AA5182-O inner panel.

FIG. 5 is a fragmentary view of a section of the welded tailgate assembly of FIG. 1 showing the shape of the weld nugget at the inner hem flange surface of the outer panel produced by using a curved laser weld beam path.

FIG. 6 is a fragmentary view of a section of the welded tailgate assembly of FIG. 1 showing the shape of the weld nugget at the inner hem flange surface of the outer panel produced by using a straight laser weld beam path.

FIG. 7 is a cross-sectional view of the welded section of the fragmentary view of FIG. 6.

DESCRIPTION OF PREFERRED EMBODIMENTS

The coherent and focused energy of laser beams is used in metal machining, heat treatment and welding operations. In the metal welding applications, lasers are often used in welding two or more sheet metal layers. For example, flanges of metal sheets are joined by using a laser beam to melt through the thickness of the upper flange and into the lower flange of an assembly. The laser beam is usually moved relative to the workpiece to trace a linear path, straight or non-straight, along the flange area, or other area to be joined, and after the laser beam has moved along its path, molten metal solidifies by heat loss to the adjacent sheet material to form a weld nugget. There is always a desire to form laser welds faster, with greater accuracy and better process control.

There is also a desire to apply laser welding technology to joining light weight sheet metal parts, such as automotive vehicle body panels. But when laser welding is attempted on aluminum alloy panels it is often found that the weld nuggets are susceptible to cracking. The problem is often seen when making continuous linear welds between flanges that are hemmed. Such "hot cracking" is apparently a result of rapid shrinkage of the solidifying weld pool as heat is dissipated due to the relatively high thermal conductivity of the surrounding metal of the workpiece(s). This invention provides a practice of combining the beams of two lasers so as to rapidly form continuous weld lines in highly thermal conductive light metal alloy workpieces without hot crack formation in the new bond.

Figure 1:
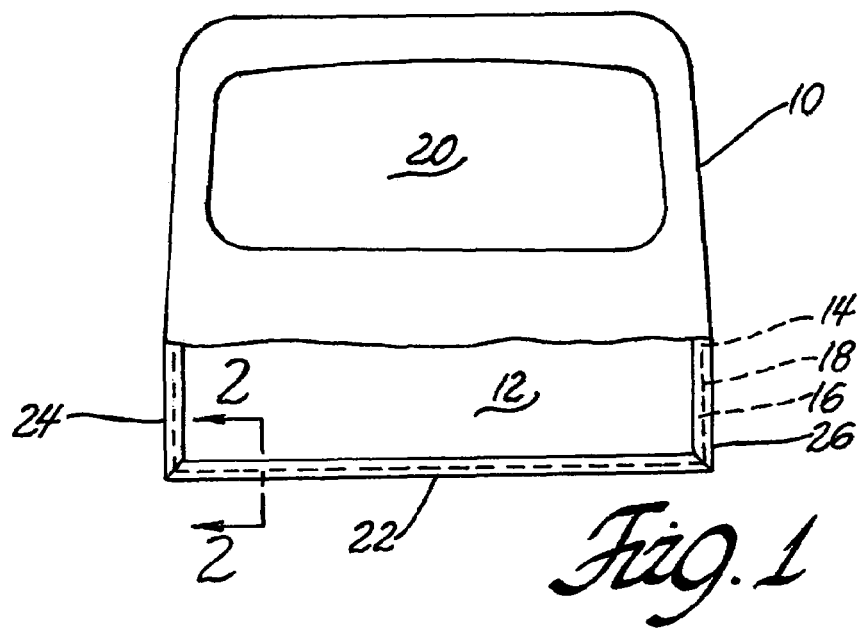
FIG. 1 is an outline view of a laser welding application, in accordance with this invention, in which flanges of inner and outer automotive vehicle tailgate panels are hemmed. A lower portion only of the inner panel is shown in peripheral outline lying over the backside of the outer panel which is also shown in outline.

FIG. 1 illustrates in phantom outline a plan view of a tailgate outer panel 10 for an automotive vehicle. Overlaid on the back side of outer panel 10 is the lower portion of an inner panel 12. Typically, the inner and outer panels of a vehicle tailgate are each shaped to provide the form (including window opening 20) and structural integrity of the closure member and to contain wiring for lights and hardware for hinges, latches, window wiper mechanism, and the like. But in FIG. 1 these panels are illustrated simply in their outline configuration for purposes of describing how they are welded at their edges.

In this example, the outer tailgate panel 10 has been formed by stamping a sheet metal blank of aluminum alloy AA6111 with a T4 temper condition. The inner panel 12 has been stamped from a sheet metal blank of AA5182 in an O temper condition.

Outer panel 10 has a peripheral flange 14 and the inner panel 12 likewise has a peripheral flange 16. The respective flanges 14, 16 extend at the edges of each panel and flange 14 of outer panel 10 extends outwardly of flange 16 of inner panel 12. In FIG. 1, inner panel 12 is shown broken off above the lower portion of the outer panel 10 for simplicity of illustration (as is the upper portion of flange 14 of the outer panel), but in practice the inner panel 12 would generally complement the full shape of the outer panel 10. Flange 14 of the outer panel 10 extends outwardly of flange 16 of the inner panel 12 and is folded over the end 18 of the inner panel flange 16 in a hemming operation. The configuration of these hemmed flanges is shown in the broken off, fragmentary and sectional view of FIG. 2. Thus, as a result of the hemming of the flange 14 of the outer panel 10 around end 18 of flange 16 of inner panel 12, the outer panel 10 mechanically grips the inner panel 12 around at least the bottom 22, the lower right side 26 and lower left side 24 of the assembled panels as depicted in FIG. 1.

In the practice of this invention, a compound laser beam is then directed and moved around the hemmed flanged assembly to produce a weld in the assembly and thus securing the attachment of the inner panel to the outer panel. The general path of the weld around the periphery of the attached panels follows parallel to, but inside of, the outer edge 18 of the inner panel 12.

Figure 2:
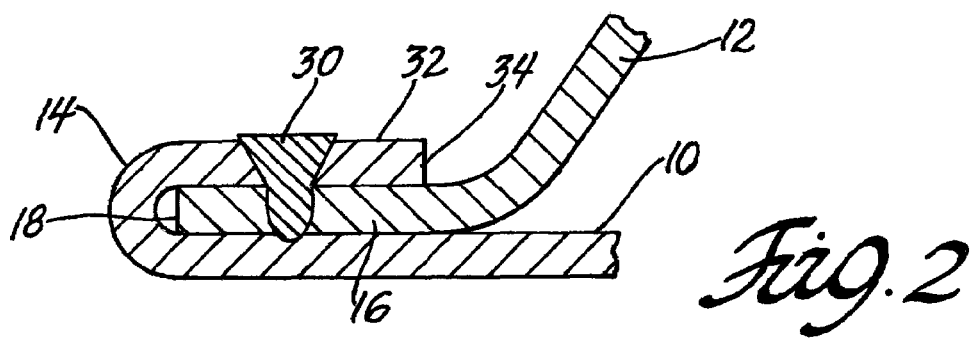
FIG. 2 is a cross-sectional view of the hem weld environment at location 2-2 of FIG. 1.

The cross-section of a local portion of the weld nugget 30 is shown in the cross-sectional view of FIG. 2. Weld nugget 30 has been formed from the top surface 32 of flange 14 (as seen in FIG. 2) and extends through the folded-over end portion 34 of flange 14 and through flange 16 of the inner panel.

Figure 3:
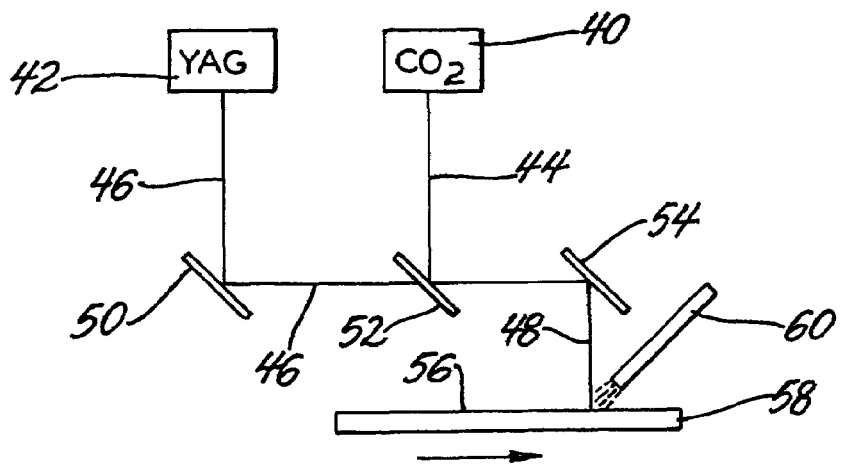
FIG. 3 is a schematic illustration of the combining by optics of a $CO_2$ laser beam and a YAG laser beam to form a compound laser beam for forming welds in accordance with this invention.

In accordance with this invention, the weld is produced by a compound laser beam that includes the beam of a carbon dioxide laser merged with the beam of a neodymium: YAG laser. FIG. 3 illustrates schematically a $CO_2$ laser 40 and a YAG laser 42. These laser generators are commercially available with control systems by which the output power of the respective lasers 40, 42 can be individually controlled. The YAG laser beam 46 (at a wavelength of 1.06 micrometers) is reflected by YAG beam mirror 50 to compound laser beam mirror 54. Similarly, $CO_2$ laser beam 44 (at a wavelength of 10.6 micrometers) is reflected by $CO_2$ beam mirror 52 to common laser beam mirror 54. Beams 44 and 46 are combined at mirror 54 and directed as a compound beam 48 to the surface 56 of a workpiece 58, such as the hemmed flanged inner and outer panel assembly of FIG. 1. FIG. 3 is a planar representation of the arrangement of lasers 40 and 42. Mirrors 50 and 52 are not necessarily in a line and beams 44 and 46 do not merge until they meet at mirror 54.

Compound laser beam 48 and workpiece 58 are moved relative to each other by any suitable means to produce a continuous line weld in the hemmed flanges 14 and 16 of the tailgate assembly of panels 10 and 12. The weld site is often flooded with a protective atmosphere of a gas or mixture of gases that are inert with respect to the molten metal and laser induced plasma material at the weld site. In FIG. 3, tube 60 illustrates means of directing the protective atmosphere to the site on workpiece 58.

The reason for using the compound laser beam, at least on a part-time basis, is to vary the shape of the weld nugget in the continuous linear weld to obtain a sound, crack-free weld. By varying the shape of the weld nugget, the heat transfer from the molten local weld puddle into the surrounding assembly at ambient temperature is altered and it is found that the incidence of cracking of the weld nugget upon solidification is markedly reduced. In the case of welds in hemmed flanges of aluminum sheet metal alloys, the folded-over outer flange sheet has different heat transfer characteristics than the covered end of the inner sheet. This combination appears to lead to hot cracking in continuous linear laser welds.

In order to obtain suitable variation in the configuration of the linear weld nugget, the power levels of at least one of the YAG laser and the carbon dioxide laser are varied so as to produce a periodic variation in the energy of the compound laser beam that is incident upon the weld site as the workpiece and laser beam are moved with respect to each other. The combination of good, focused beam quality from the $CO_2$ laser and good absorption rate from the YAG laser is observed to improve weld penetration and reduce porosity. The focused $CO_2$ beam forms a narrow keyhole of molten metal where that feature is desired. The more diffuse YAG laser beam produces a wider keyhole for wider and deeper nugget formation and less porosity. By modulating the YAG laser power, the heat input is optimized to produce weld penetration while reducing shrinkage stresses.

In this example, the power level of the carbon dioxide laser was maintained at 1 kilowatt for the formation of the continuous linear weld. The power level of the YAG laser was varied from about 3 kilowatts to 0 kilowatt over regular intervals. The YAG laser was repeatedly turned on for 200 ms and off for 100 ms. Thus, the total power of the compound beam laser was at a level of 4 kilowatts for a first 200 millisecond interval and then reduced to a level of 1 kW for a following 100 millisecond interval. This variation in power levels of the compound laser beam was repeated at 3.3 Hz as the weld was formed. The compound laser beam was moved around the periphery of the workpiece at a rate of 5.5 meters per minute. A shielding gas consisting of a mixture of helium nitrogen and argon was flowed at a rate of 14 liters per minute at the site of the incident laser beam.

FIG. 4 illustrates the power levels of the respective components of the compound laser beam, the power level of the $CO_2$ laser is seen to be constant at one kilowatt during application of the laser beam to the weld site. In this example, the power level of the YAG level was held at 3 kW over a 200 millisecond interval and then abruptly dropped step-wise to 0 kilowatts. The process of increasing and decreasing the power level of the YAG laser beam was continued throughout application of the compound laser beam to the flanged tailgate assembly.

In accordance with this hemmed flange welding embodiment, the laser beam is preferably moved in a sinusoidal path with respect to the edge 34 of outer flange 10 and edge 18 of inner flange 16 of the flanged assembly so that it produces a long curved linear weld nugget 62 of varied cross-section as illustrated in FIG. 5. Compound laser beam 48 was directed against top surface 32 of flange 14 of outer panel 10 to produce the long curvilinear weld nugget 62. The sequence of laser power settings and the advancing laser beam is controlled to produce narrow nugget strips 66 closer to edge 18 of inner flange 16 and wide nugget strips 64 closer to end portion 34 of flange 14. With this welding strategy, the constraint from bent portion of flange 14 and shrinkage stresses from nugget strip 62 do not result in cracking in the weld.

Thus, linear weld nugget 62 is not of a constant cross-section as might be suggested by the one location section of FIG. 2 and depicted in nugget 30. Linear weld nugget 62 has alternating wide nugget portions 64 and narrow nugget portions 66. The wide weld nugget portions 64 are longer than narrow portions 62 because the higher power compound laser beam was on twice as long, 200 ms, as when the YAG laser was turned off. The differences between wide nugget portions 64 and narrow nugget portions 66 are greater than their surface profiles as illustrated in FIG. 5. These further differences in the structure of curvilinear linear weld nugget 62 will be illustrated with respect to FIG. 7.

Alternatively, in another example, the compound laser beam may be moved in a generally straight path with respect to the edge of the flanged assembly as illustrated in FIG. 6. A straight line weld nugget 68 is produced with the alternating short narrow nugget strip portions 70 and longer wide nugget strip portions 72. During the 100 millisecond periods of relatively lower power application ($CO_2$+YAG=1 kW total laser output power) the weld nugget is seen to be shorter and thinner (nugget portions 70) and over the 200 millisecond duration of the higher power application (4 kW total laser power), the weld nuggets 72 are longer and wider. The cross-sectional view of FIG. 7 confirms that the overall size of wide nugget strip 72 is larger than the cross-section of narrow nugget strip 70. It is found that a suitable variation in the size of the weld nugget strip portions produces strong welds without hot cracks.

It will be appreciated that different metal alloys and different thicknesses of the sheet metal pieces to be attached will use different power levels of the constituents of the compound laser beam. In this example, the power level of the better focused, longer wave-length, carbon dioxide laser beam was maintained at a fairly constant level for its consistent energy application in the course of the welding. The power level of less focusable YAG laser beam constituent was varied by turning it on and off. The amount of the variation and the power levels of the laser beams can be determined experimentally. In any welding set up, the levels are of course set to produce strong affective weld but to avoid the formation of cracks in the weld nugget as it solidifies.

In general, the practice of the invention is applied to continuous linear welds, straight or non-straight. But the use of compound laser weld beams could also be used beneficially in forming welds in a dashed, or interrupted, linear sequence.

While the invention has been described in terms of the specific embodiment, it is obvious that other forms could readily be adapted by one skilled in the art accordingly the scope of the invention is to be considered to be limited only by the following claims.

The invention claimed is:

1. A method for forming a weld in an assembly comprising the edge of a first sheet metal flange folded over the edge of a second sheet metal flange, the edge of said second sheet metal flange being enclosed within the folded-over edge portion of said first flange and unfolded sheet portion of said first flange, said method comprising:

combining the beam of a first laser material at a first laser power level with the beam of a second and different laser material at a second laser power level into a compound beam;

directing said compound beam at the surface of the folded-over edge portion of said first flange;

moving said compound beam along said surface in a linear weld path; and varying at least one of said first laser power level and said second laser power level during said movement of said compound beam so as to produce variation in the width and depth of weld nugget material produced along said weld path.

2. The method of forming a weld as recited in claim 1 in which said first and second sheet metal flanges are made of aluminum alloy and said first laser beam is a carbon dioxide laser and said second laser beam is a YAG laser.

3. The method of forming a weld as recited in claim 2 comprising:
combining the beam of a carbon dioxide laser beam at a carbon dioxide laser power level with the beam of a YAG laser at a YAG laser power level into a compound beam; and
maintaining said carbon dioxide power level at a carbon dioxide power value while varying said YAG laser power level from a first value to a second value where said second value may be zero power, said combination of said carbon dioxide power level with the varied YAG laser power levels producing weld nugget segments along said weld path of alternating different configurations that are free of hot cracks.

4. The method of forming a weld as recited in claim 1 comprising:
moving said compound beam along said surface in a sinusoidal weld path with first alternating peak portions toward the edge of said first sheet metal flange and second alternating peak portions away from said edge; and
varying at least one of said first laser power level and said second laser power level so as to produce alternating larger weld nugget segments at said first alternating peak portions and smaller weld nugget segments at said second alternating peak portions.

* * * * *